United States Patent
McBain et al.

(10) Patent No.: US 6,794,575 B1
(45) Date of Patent: Sep. 21, 2004

(54) ELECTRICAL OUTLET SAFETY COVER

(76) Inventors: Theodore McBain, 515 Nightingale Rd., Tahoe City, CA (US) 96145; Melvin R. Osborn, 268 Park, Brockway Vista, CA (US) 96145

(*) Notice: Subject to any disclaimer, the term of this patent is extended or adjusted under 35 U.S.C. 154(b) by 0 days.

(21) Appl. No.: 09/162,387

(22) Filed: Sep. 28, 1998

Related U.S. Application Data (62) Division of application No. 08/708,344, filed on Sep. 6, 1996, now Pat. No. 5,813,873.
(60) Provisional application No. 60/003,364, filed on Sep. 7, 1995.

(51) Int. Cl.$^7$ .............................. H05K 5/03
(52) U.S. Cl. ................... 174/67; 220/242; 439/137
(58) Field of Search ................ 174/67; 220/242; 33/528, DIG. 10; 439/137

(56) References Cited

U.S. PATENT DOCUMENTS

| | | | |
|---|---|---|---|
| 943,958 A | * 12/1909 | Wheeler | 220/242 |
| 1,131,093 A | * 3/1915 | Sperry | 220/242 |
| 2,477,803 A | 8/1949 | Huber | 174/67 X |
| 3,810,070 A | 5/1974 | Ludwig | 174/67 X |
| 4,159,858 A | * 7/1979 | Toraya | 174/67 X |
| 4,435,032 A | 3/1984 | Abramson et al. | 336/36 |
| 4,484,185 A | 11/1984 | Graves | 174/66 X |
| 4,493,517 A | 1/1985 | Hillary | 339/42 |
| 4,514,024 A | 4/1985 | Clark | 339/40 |
| 4,607,136 A | 8/1986 | Thomas | 174/67 |
| 4,640,564 A | 2/1987 | Hill | 339/40 |
| 4,729,741 A | 3/1988 | Peng | 439/137 |
| 4,733,017 A | 3/1988 | Wolfe-Taylor et al. | 174/67 |
| 4,798,916 A | 1/1989 | Engel et al. | 174/67 |
| 4,801,271 A | * 1/1989 | Piper | 174/67 X |
| 4,932,886 A | 6/1990 | Glaser | 439/137 |
| 4,952,755 A | 8/1990 | Engel et al. | 174/67 |
| 5,026,299 A | 6/1991 | Foulk | 439/137 |
| 5,080,599 A | * 1/1992 | Wimberly | 174/67 X |
| 5,096,430 A | * 3/1992 | D'Amico | 174/67 X |
| 5,240,426 A | 8/1993 | Barla | 174/67 X |

* cited by examiner

Primary Examiner—Dean A. Reichard (57) ABSTRACT

A safety cap for an electrical outlet having an adhesive section can be attached to a standard outlet cover. The adhesive section connects the electrical outlet safety cover to the electrical outlet. The safety cap includes prongs made of a non-electrically conductive material shaped to fit into the electrical outlet. The bendable section rotates the prongs from a position outside the electrical outlet to a position inside the electrical outlet.

6 Claims, 12 Drawing Sheets

ELECTRICAL OUTLET SAFETY COVER

RELATED APPLICATIONS

This is a division of application Ser. No. 08/708,344 filed on Sep. 6, 1996, now U.S. Pat. No. 5,813,873, which is based on provisional application Ser. No. 60/003,364 filed Sep. 7, 1995.

This regular patent application corresponds to U.S. provisional patent application 60/003,364, entitled "Electrical Outlet Safety Cover" filed Sep. 7, 1996.

BACKGROUND ART

In residential and other structures, electrical outlets are generally positioned a short distance above the floor. This makes the outlets readily accessible to small children. A curious child is inclined to test and probe his environment and may stick objects, such as paper clips, into the prong receiving openings of an electrical outlet. This exposes him to the danger of shock or even death.

Additionally, an exposed outlet presents the problem of "carbon fires" that can occur when dust accumulates in an outlet.

In spite of generally widespread knowledge of the dangers that electrical outlets present to small children, very few devices are commercially available for denying a child access to an outlet. The most commonly available device is a small plastic disk with prongs that plug into the openings of an outlet receptacle. The disk covers the receptacle and takes the place of an electrical plug to prevent insertion of any other object in the openings. A major disadvantage of this type of device is that the disk may easily become lost or mislaid when it is temporarily removed to allow normal use of the outlet.

There have been a number of proposals for providing a permanently mounted safety cover for electrical outlets to make the prong receiving openings inaccessible to a child. Such proposals generally provide an inadequate solution either because the safety cover is too easily defeated by a child who is still too young to understand the dangers of electricity or because the covering device is unduly complicated and/or cumbersome.

It is desired to have an improved electrical outlet safety cover that avoids some of the problems of the prior art.

SUMMARY OF THE INVENTION

One embodiment of the present invention uses a safety cap including prongs made of a non-electrically conductive material which is attached to a bendable section for rotating the prongs from a position outside an electrical outlet to a position inside an electrical outlet and an adhesive section for connecting the cap to a standard electrical outlet cover plate. The use of the adhesive section allows the cover to be placed on the standard electrical outlet. This embodiment can be made relatively cheaply. Such an embodiment can be a "T"-shaped plastic member with molded-in prongs; a dual unit hinged at a center cross-member; or a cover having an adhesive strip around its frame-like shape. Tabs can be used on the cap to make the cap removal easier. A ridge on the cover back can acts as a pivot when the cap is pressed so that the tab may be easily gripped.

Another embodiment uses a pair of electrically non-conductive, slidable plates. Each plate includes some type of spring to purposefully misalign apertures in the plate and the respective outlet slots to prevent access to the outlet slots. The outlet can be accessed by squeezing the plates together. An elongated member is used to contact a spring on the other plate. Alternately, the elongated member can fit into a spring groove to bias the plates apart into the closed position.

Locking pins can be used to lock the plates onto an aperture at the base of a plug's power prong. The locking pins can be disengaged by squeezing the plates together or by pulling on the plug with some predetermined amount of force. The required predetermined amount of force should be large enough to deter children from removing the plug but small enough to prevent damage to the outlet. The amount of force is the result of the size and material, preferably memory plastic, of the locking pin.

Each receptacle is preferably designed to require two hands to operate so that children will be less likely to accidently remove the plug.

The invention may include a recessed perimeter around each electrical outlet (or an extending lip around each electrical outlet) which mates with a respective lip (or recess) of a plug portion to provide an interlocking interface between the plug and outlet cover. This feature will prevent a child from being able to insert a metal object between the plug and the face-plate.

The devices of the present invention may include a lighting device such as an LED or neon lighting device incorporated into the body of the face-plate; an illuminated sign; or a chemiluminescent device.

Additionally, the faceplate may include a coaxial or video cable connection; a button camera or video "eye" 106; telephone receiver jack(s); and/or a motion sensor and/or infrared sensor.

The AC wiring may be used to carry the individual signals for each component. The motion sensor can be used to trigger the video eye and send message to a main computer. This enables the safety cover of the present invention to be used as a security/surveillance device. The coaxial output port may be adapted to provide conventional cable TV signals, and/or the video signal from the video eye.

BRIEF DESCRIPTION OF THE DRAWINGS

The above and other features and aspects of the present invention will become more apparent upon the reading of the following detailed description in conjunction with the accompanying drawings, in which.

DETAILED DESCRIPTION OF THE INVENTION

FIGS. 1–4

In the simplest form of the invention (FIGS. 1A–C), a "T"-shaped plastic member 21 has molded-in prongs that articulate into and out of engagement with the outlet slots. The "T"-shaped member has an adhesive strip 22 applied to the back of the horizontal of the "T," which sticks to the face of a duplex outlet cover plate (not shown). It is thus restrained from loss. A bendable portion 24 allows the prongs 20 to bend in and out of the receptacle (not shown).

Another variation (FIGS. 2A–B) has a cross-member in the center having a centrally-disposed hole 26 therein for receiving the mounting screw normally found in duplex outlets. Adhesive at area 28 also helps hold the cover on the outlet.

Still another variation (FIGS. 3A and 3B) has an adhesive strip all around its frame-like shape 30 for mounting.

Figure 1A:
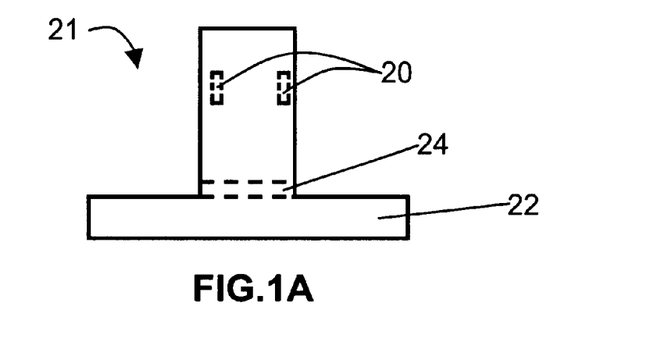
FIGS. 1A–C are front, top and side views of a safety cover of the present invention.
Figure 1B:
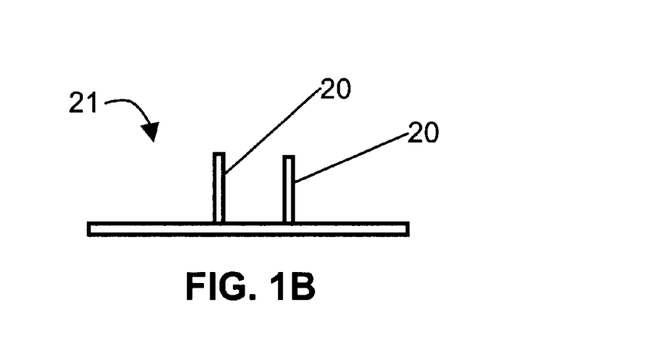
Figure 1C:
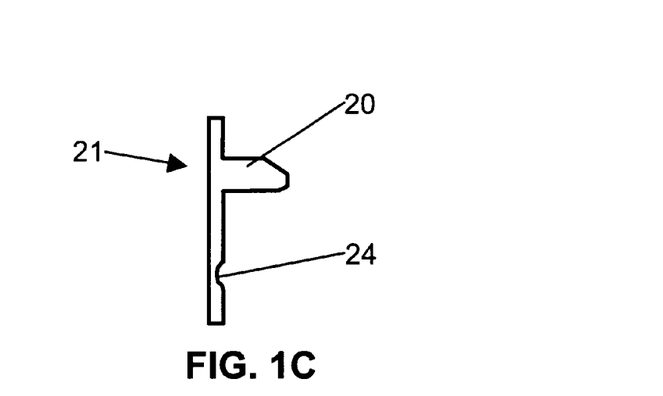
Figure 2A:
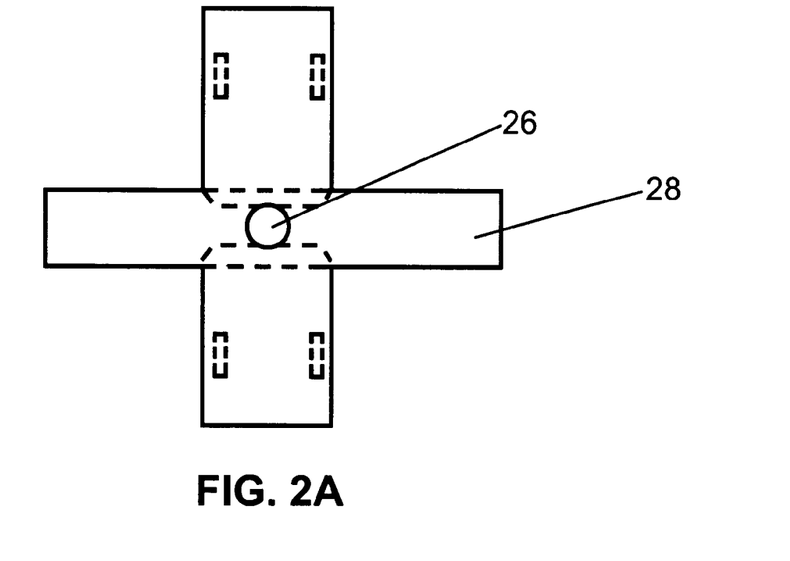
FIGS. 2A–B are front and side views of an alternate embodiment of a safety cover of the present invention.
Figure 2B:
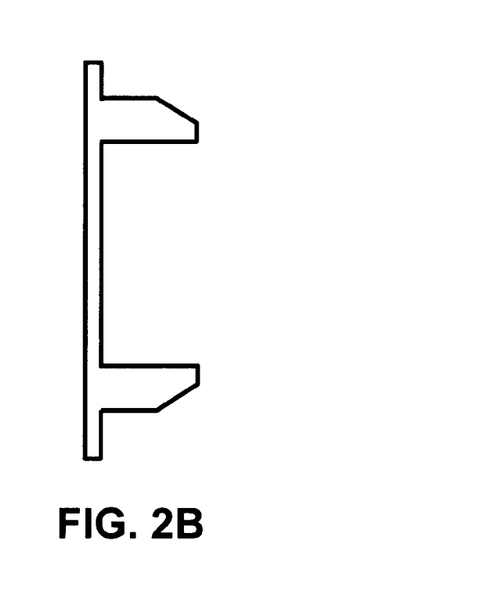
Figure 3A:
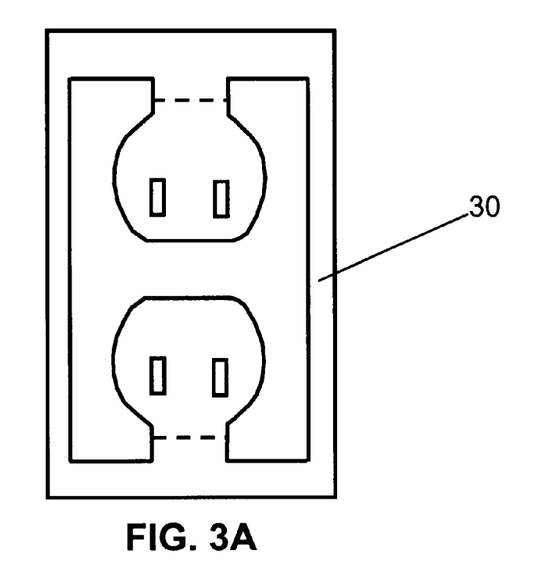
FIGS. 3A and 3B are front and side views of an still another alternate embodiment of a safety cover of the present invention.
Figure 3B:
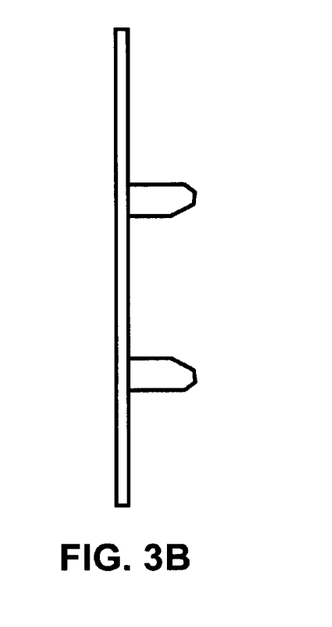
Figure 4:
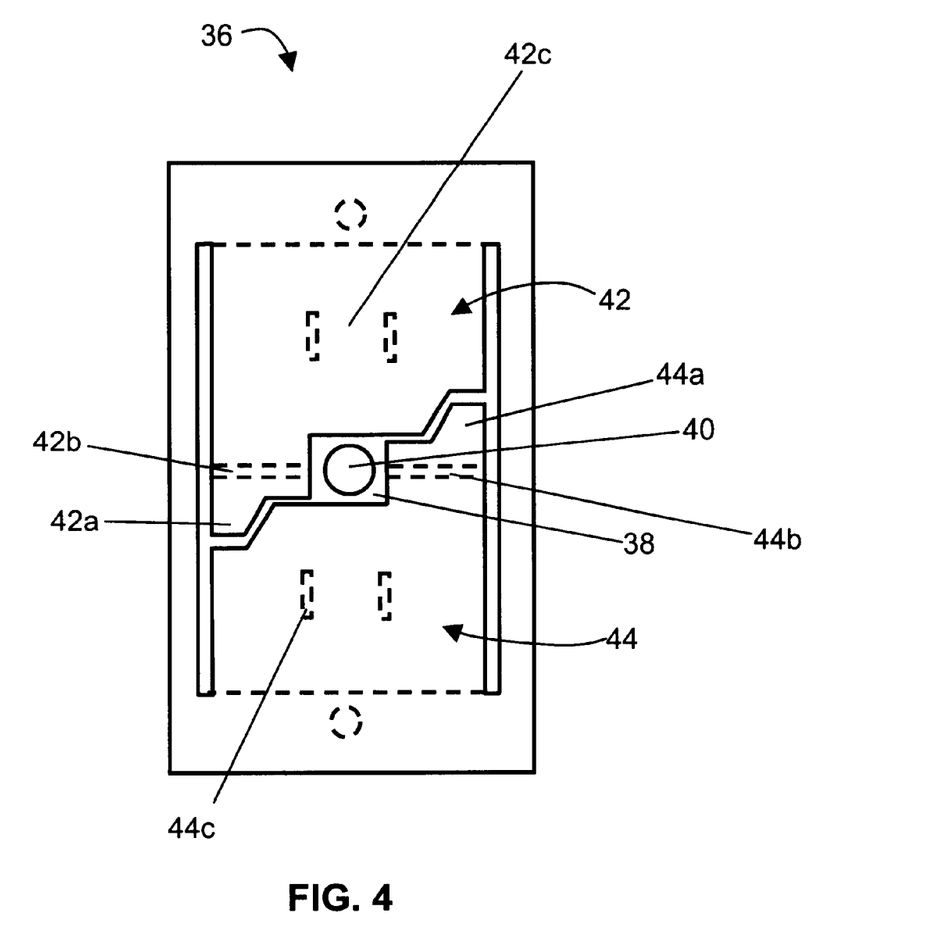
FIG. 4 is a front view of a safety cover of the present invention using tabs on the safety cap.

The embodiment shown in FIG. 4 is similar to the embodiment of FIG. 3. The entire duplex plate is covered except for a square cut-out 38 in the center to permit access to the centrally disposed mounting screw 40 of the faceplate. The articulatable portions 42 and 44 have a zig-zag configuration to produce tabs 42a and 44a for lifting. A linear ridge 42b and 44b on the backsides acts as a pivot when the articulatable member 42 and 44 is pressed a central portion 42c and 44c is depressed, so as to extend the tab 42a and 44a so that it may be easily gripped. A centrally located bar could also be used rather than a linear ridge. The hinged covers of the FIG. 4 embodiment may be pivotally connected to the top and bottom portions of the cover frame, rather than the side portions. This feature is advantageous in that it facilitates the ease of inserting and removing the prongs into and out from the electrical outlet receptacles. Additionally, the cover is universally adaptable to fit all types of conventional outlets currently on the market, whereas at least some of the covers illustrated in the prior art patents are not adaptable for use with Decora- or GFI-type electrical outlets.

FIGS. 5–15

Figure 5:
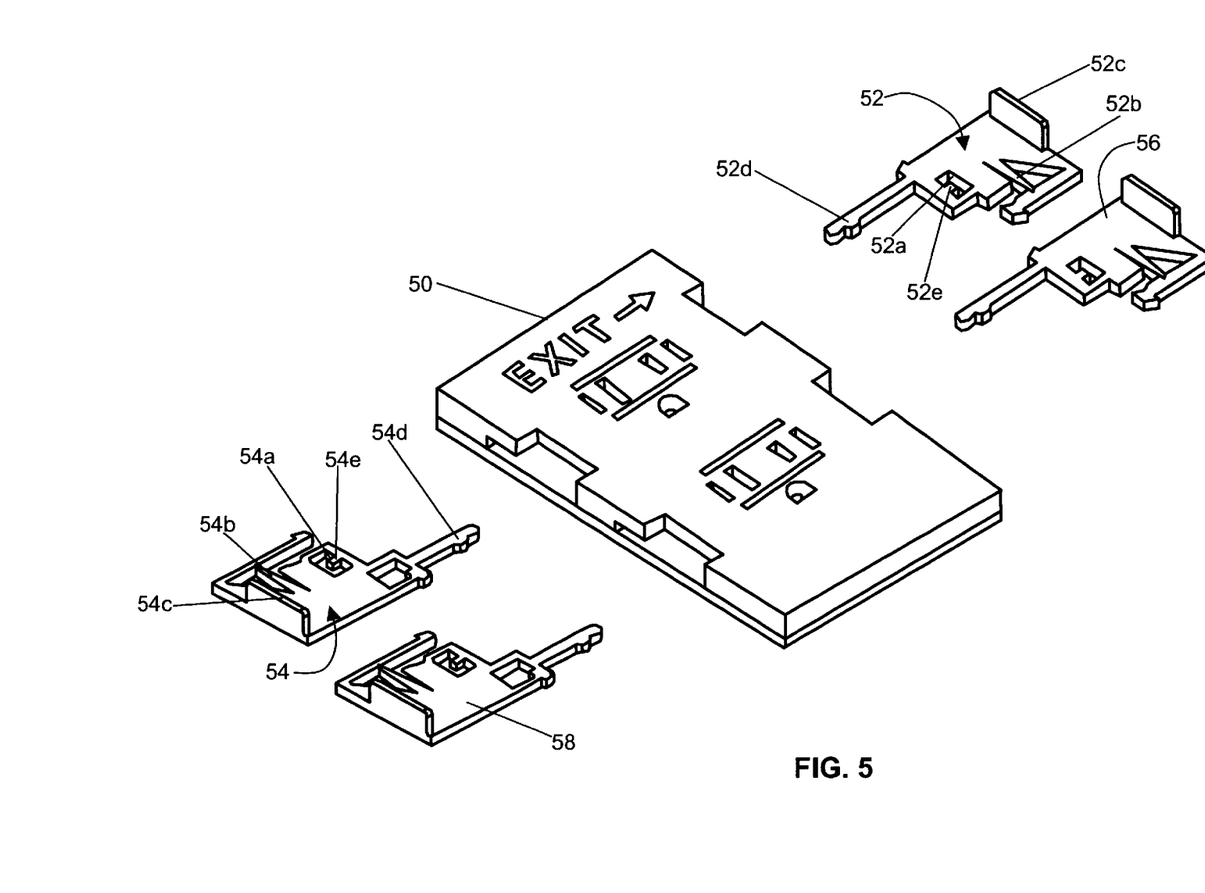
FIG. 5 is an exploded view of an embodiment of the present invention having pairs of electrically non-conductive, slidable plates located in front of each electrical outlet slot.

FIG. 5 shows an embodiment of the present invention using a pair of electrically non-conductive, slidable plates 52,54 and 56,58 located in front of each electrical outlet slot. Each plate includes at least one aperture 52a,54a therein for permitting a male plug (not shown) to be inserted through the respective aperture and into the electric outlet slots when the apertures are properly aligned with the outlet slots. Each plate 52,54 includes some type of spring 52b,54b which purposefully misalign the apertures and the respective outlet slots to thereby prevent access to the outlet slots. In the embodiment of FIG. 5, an elongated portions 52d and 54d engages springs 54b and 52b respectively. The apertures may be properly aligned to the outlet slots by pushing the two plates closer together. To accomplish this, the outlet cover (or female receptacle) will include a pair of tabs 52c and 54c or other surface connected to the plates 52 and 54 for permitting an adult to grip the tabs between thumb and forefinger and push the two plates together (overcoming the spring tension) until the holes in the plates are aligned with the electrical outlet slots. The sliding plates are preferably made of a memory plastic material. The cover and/or sliding plates may be made of kevlar/mylar plastic, for example.

Also shown in FIG. 5 are the locking pins 52e and 54e. The locking pins 52e and 54e lock into a hole at the base of a power prong, shown in FIG. 11. To remove the plug once locked, the tabs 52c and 54c are pressed together slightly; then the plug is removed. After the plug is removed the spring action will move the plates back to the closed position. Once the plug is inserted into the outlet and locked, a child will then be unable to remove the plug or a portion of it from the outlet. The plug lock may include a quick-release mechanism which will keep the plug locked into the receptacle until the plug is pulled with some predetermined amount of force, such as, for example, 15 lbs. It is noted that the force for the quick-release mechanism can be changed to accommodate O.S.H.A. standards. This can be the result of the size and material of the locking pin. A plastic locking pin is preferable. To unlock the plug, the two side tabs are squeezed together, then the plug is pulled from the outlet or extension cord. In order for the plug to lock into the wall receptacle or extension cord, a specially designed plug and/or special plug adapter is used.(See, e.g. FIGS. 11 and 13A–B)

Figure 6:
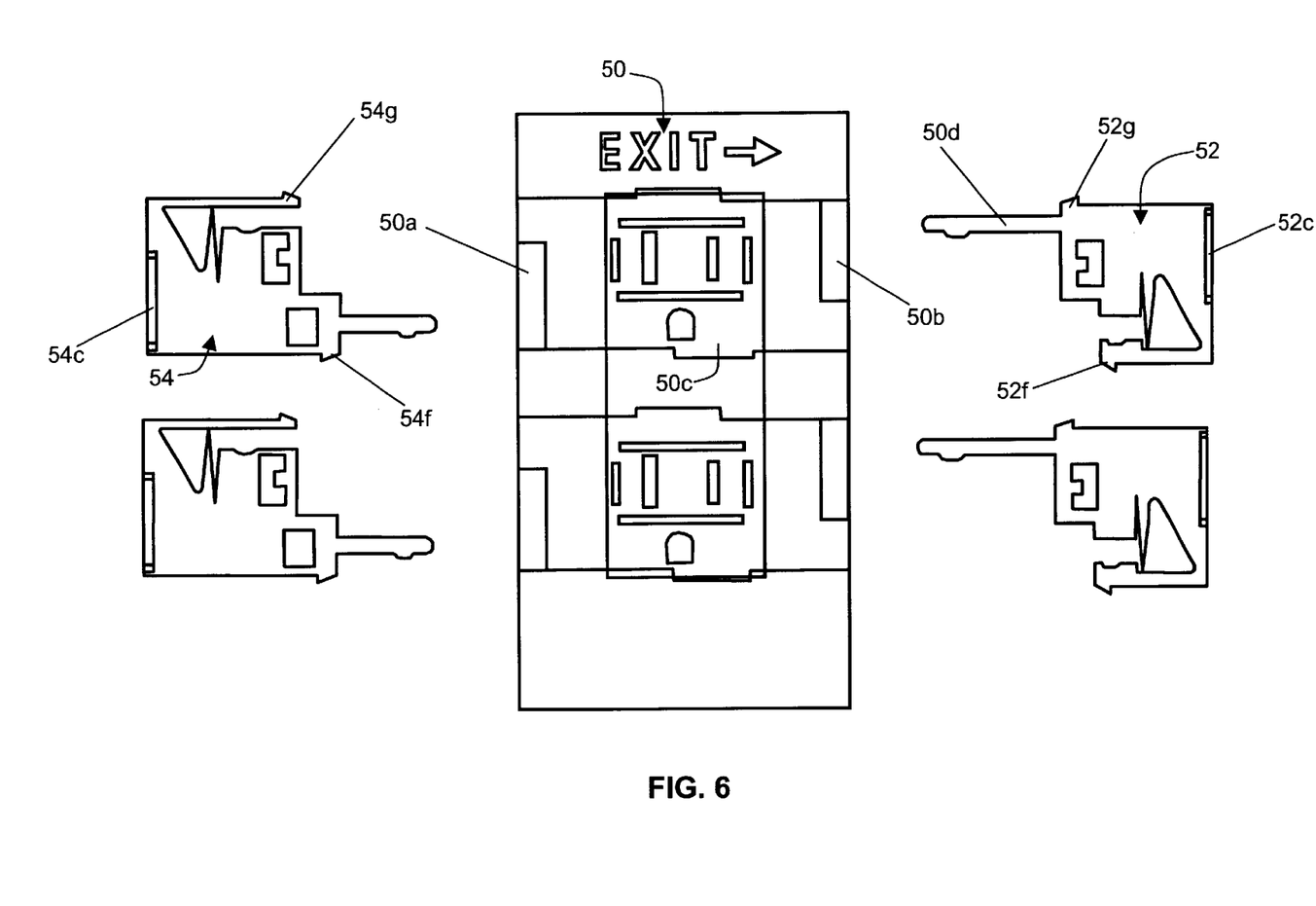
FIG. 6 is a top diagram of the embodiment of FIG. 5.

FIG. 6 is a diagram of the embodiment of FIG. 5. This view illustrates the positioning of the plates 52 and 54 in the outlet cover 50. Plate 50 has a space 50a for tab 54c, space 50b for tab 52c, space 50c for tabs 54f and 52f; and space 50d for tabs 52g and 54g.

Each receptacle is preferably designed to require two hands to operate. One hand is used to open doors to gain access to receive. The other hand is used to plug in cord or device. It is preferable that the safety cover be designed such that the door that covers the common side of the receptacle be pushed prior to the hot side door for access to be gained.

Figure 7:
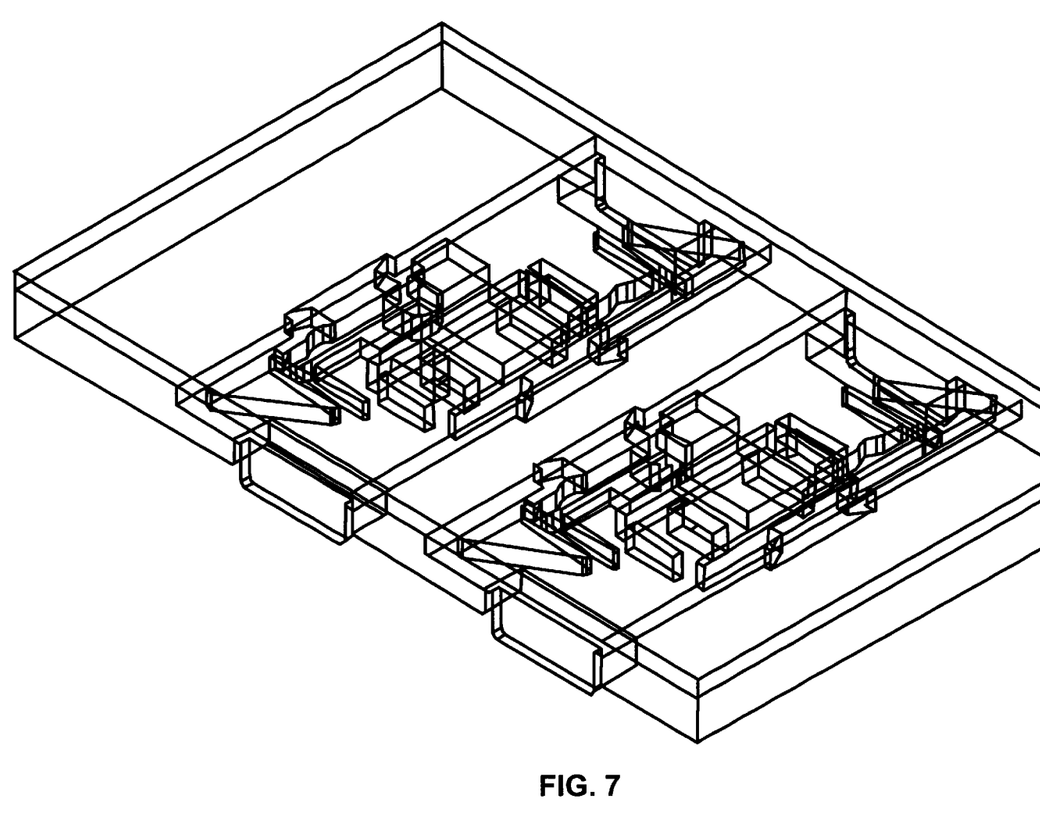
FIG. 7 is a computer aided drawing further illustrating the positioning of the plates in the outlet cover of the embodiment of FIG. 5.

FIG. 7 is a computer aided drawing further illustrating the positioning of the plates in the outlet cover.

Figure 8A:
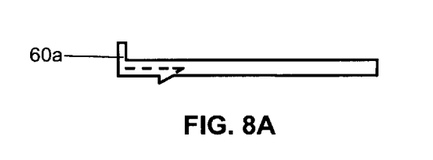
FIGS. 8A, 8B and 8C are first side view, top view and second side view of an alternate slidable plate.
Figure 8B:
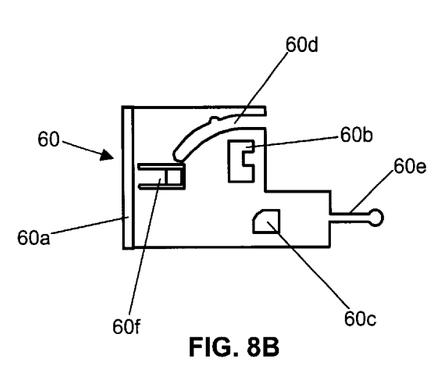
Figure 8C:
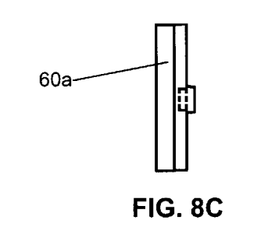
Figure 9A:
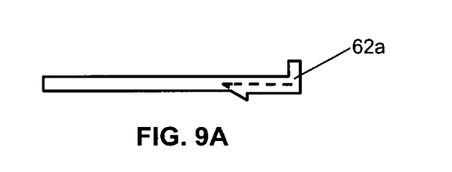
FIGS. 9A, 9B, 9C are first side view, top view and second side view of an slidable plate for use with the slidable plate of FIGS. 8A–C.
Figure 9B:
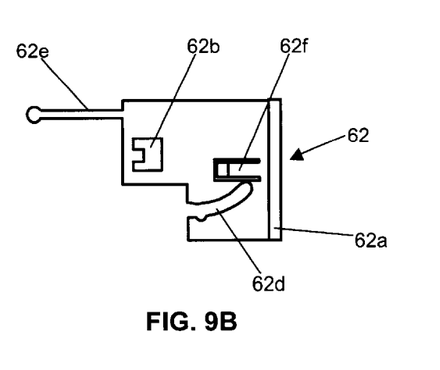
Figure 9C:
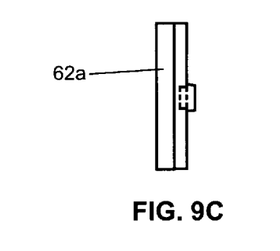

FIGS. 8A–C and 9A–C illustrate an alternate embodiment of sliding plates of the present invention. FIGS. 8A, 8B and 8C are first side view, top view and second side view of an sliding plate 60. Sliding plate 60 has a tab 60a, power prong aperture 60b, ground prong aperture 60c, spring groove 60d, and elongated member 60e. FIGS. 9A, 9B, 9C are first side view, top view and second side view of an sliding plate 62. Sliding plate 62 has a tab 62a, power prong aperture 62b, spring groove 62d, and elongated member 62e. The elongated members 60e and 62e engage the spring groove 62d and 60d respectively to normally bias the plates into the closed position.

Figure 10A:
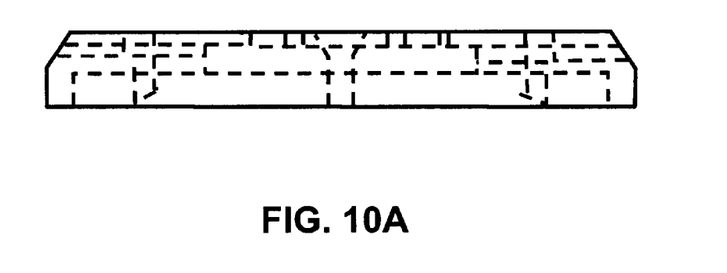
FIGS. 10A and 10B are the side and top views of a outlet cover for use with the slidable plates of FIGS. 8A–C and 9A–C.
Figure 10B:
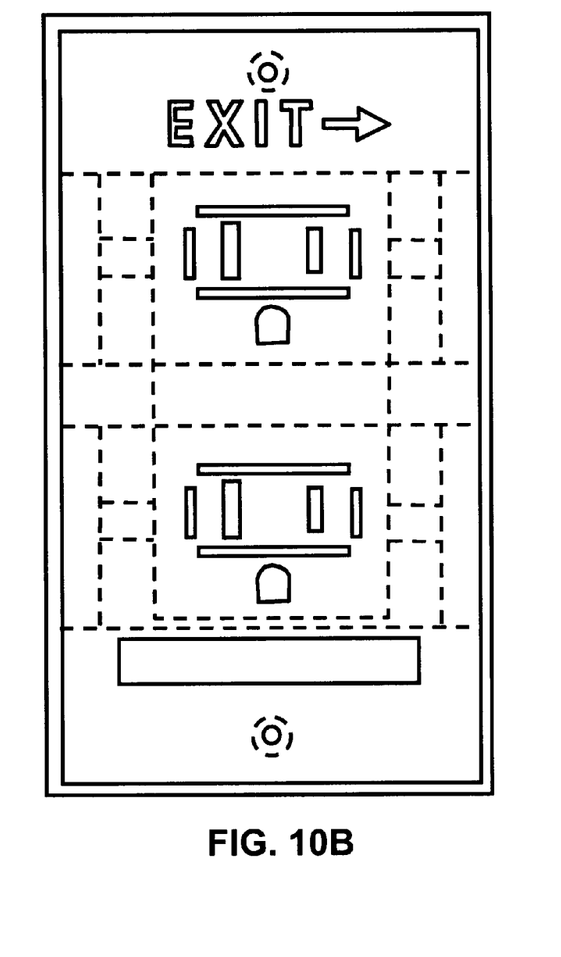

FIGS. 10A and 10B are the side and top view of a outlet cover for use with the slidable plates of FIGS. 8A–C and 9A–C.

The invention may include a recessed perimeter around each electrical outlet (or an extending lip around each electrical outlet) which mates with a respective lip (or recess) of a plug portion to provide an interlocking interface between the plug and outlet cover. This feature will prevent a child from being able to insert a metal object such as a knife or screwdriver between the plug and the face-plate, whereupon the metal object would otherwise simultaneously contact both the grounded portion of the plug as well as the live portion of the plug.

Figure 11:
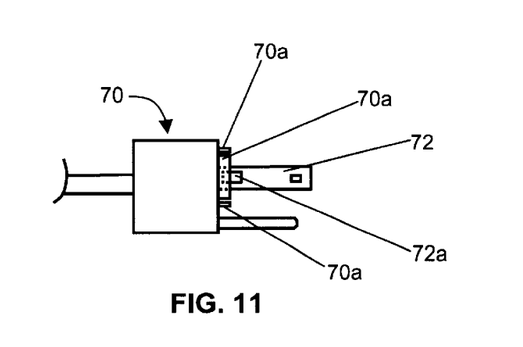
FIG. 11 is a perspective view showing a plug having a lip.
Figure 12A:
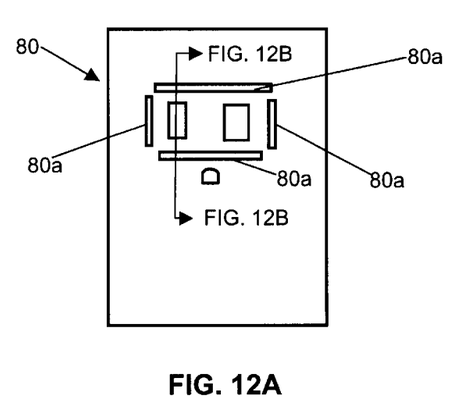
FIG. 12A is a front view of an receptacle having recesses to fit the lip of the plug of FIG. 11.
Figure 12B:
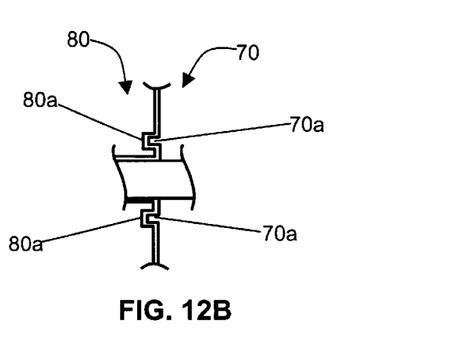
FIG. 12B is a cross-sectional view along line A—A' of FIG. 12A showing the lip of the plug fitted into the recess of the outlet.

FIG. 11 shows a plug 70 with a lip portion 72. The lip portion 72 fits into a recessed portion 82 in outlet cover 80 of FIG. 12A. This is also shown in FIG. 12B. This feature is also used with the outlets of FIGS. 5 and 10A–B. Looking again at FIG. 11, note that the power prong 72 includes an aperture 72a for holding a locking pin.

Figure 13A:
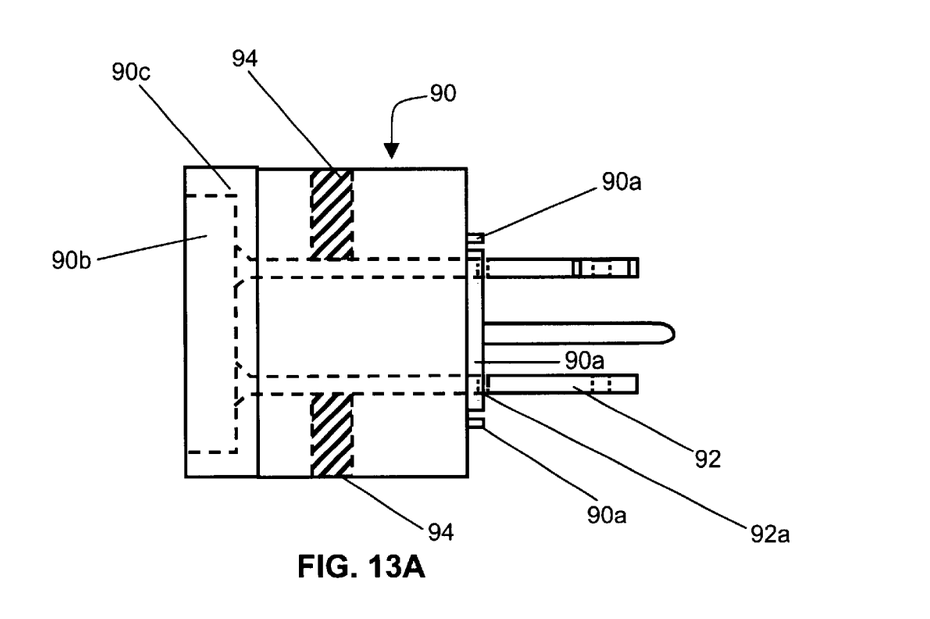
FIGS. 13A and 13B are top and side diagram views of a plug adapter of the present invention.
Figure 13B:
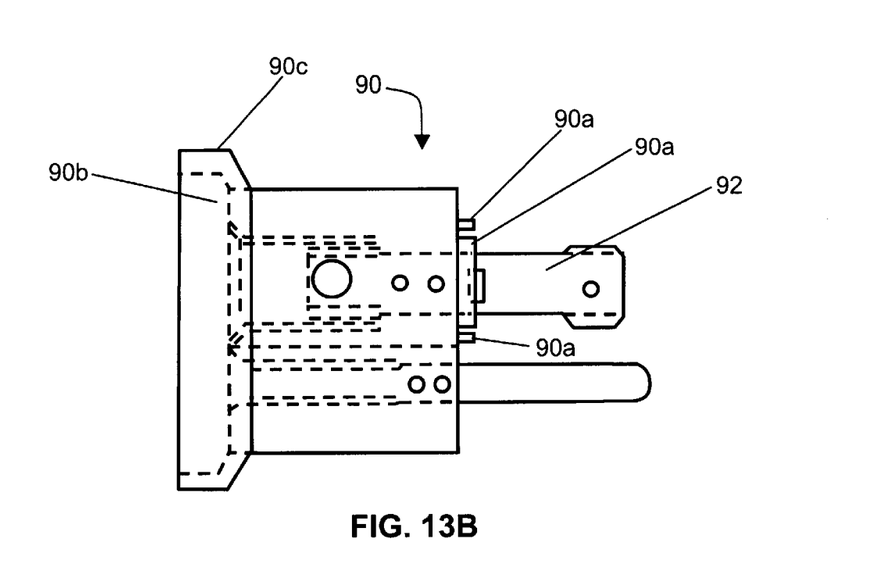

FIGS. 13A–B are top and side diagram views of an adapter 90. Adapter 90 can be used to convert a regular plug to a plug usable with the embodiments described above. Adapter 90 has lip 92 for connecting with recess, such as recess 82 shown in FIGS. 12A–B. Adapter 90 also has power prong such as power prong 92 having an aperture 92a that can hold a locking pin. A regular plug (not shown) fits into the recess 90a. The plug is held in place with dielectric screws 96. The lip 90c around the recess 90b prevents metal objects from being pried between the adapter and regular plug.

Figure 14:
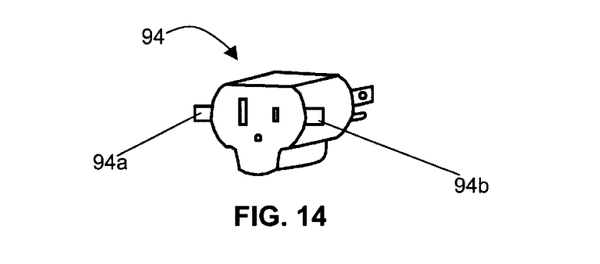
FIG. 14 is a perspective view of an plug showing two tabs for implementing the locking feature.

FIG. 14 is a view of an plug 94 showing two tabs 94a and 94b for implementing the locking feature described above.

Figure 15A:
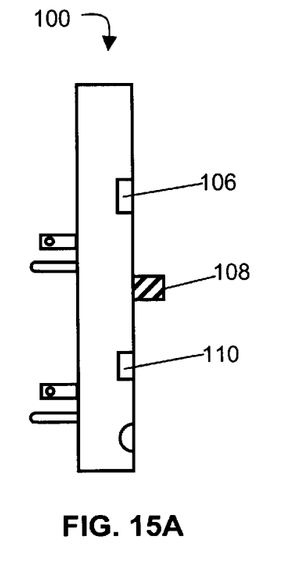
FIGS 15A and 15B are side and top views of a faceplate of the present invention.
Figure 15B:
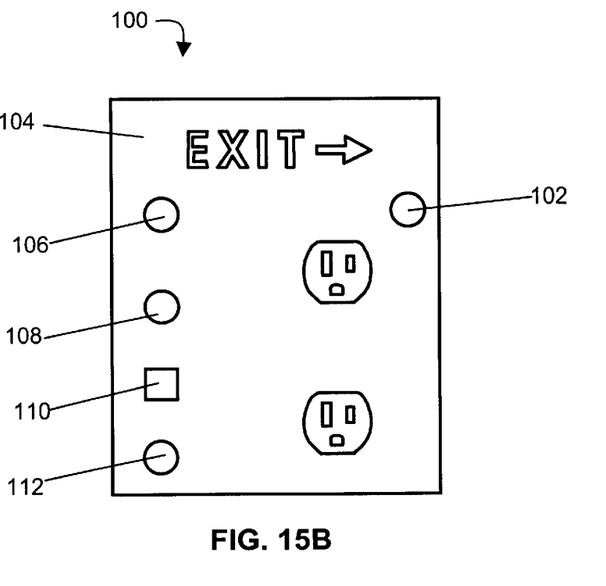

FIG. 15A–B are side and top views of a faceplate 100. The devices of the present invention may use include a lighting device such as an LED or neon lighting device incorporated into the body of the face-plate which causes the plate itself to illuminate. Faceplate 100 includes a nightlight 102. Faceplate 100 also incorporates an EXIT sign 104 into the plate to alert persons of the nearest exit in case of an emergency, such as a fire, for example. Power for the lighting device may be supplied from one of a variety of sources. First, a battery source may be used. Second, the AC voltage supply (to the outlet) may be used. In this latter case, the electrical connection to the AC voltage supply may be accomplish via hardwiring the outlet cover lighting device to the AC voltage wires. In the alternative, flexible electrically-conductive clips may be incorporated into the outlet cover (at the sides) such that when the outlet cover is placed over the electrical outlet, the clips make contact with the respective metal plates.(or screws) located at the sides of conventional outlets. These side plates (or screws) are typically used to electrically connect the electrical outlet to the AC wiring. An alternate embodiment for providing power to the lighting device is to utilize the electromagnetic field around the outlet (from the AC wiring). The technology for tapping power from an electro-magnetic field to light a lighting device is known to those skilled in the art. An example of such technology is evidenced by a conventional NON-CONTACT AC POWER DETECTOR, manufactured by Bel-Merit. One advantage of providing such a feature in the present invention is that no physical wiring need be connected between the AC power lines and the safety cover of the present invention.

Faceplate 100 may also include an opening for a small button camera 106 for permitting observation of a particular area adjacent to the electrical outlet. It is envisioned that the electrical outlet will include the camera 106 with the signal being transmitted through the electrical wiring. The faceplate would include an aperture or a clear covering for the camera lens, and may additionally include an interface for securing an optional fiber-optic extension member onto the plate for re-directing the camera view.

Alternately, the face-plate cover may also include chemiluminescent material therein for providing extra illumination to the plate, and for permitting the plate to glow or provide illumination even in the absence of power to the electrical outlet.

An alternate embodiment of the present invention applies to safety covers for conventional switched outlets such as, for example, wall mounted switches for lighting fixtures. Both receptacle covers and receptacles with switch covers will have option of having night lights 102 incorporated into the cover. The lights may be of different colors. Switch plates will have safety covers that will prevent access to the switching mechanism by children.

As shown, for example, in FIG. 15, the safety cover of the present invention may also include:

(1) an output port for a coaxial 108 or video cable connection;

(2) a button camera or video "eye" 106;

(3) telephone receiver jack(s) 110; and/or (4) a motion sensor and/or infrared sensor 112.

FM digitized code receivers may be provided for each optional component (e.g., telephone, cable, motion security detector, etc.) so that the AC-wiring may be used to carry the individual signals for each component. The motion sensor can be used to trigger the video eye and send message to a main computer. This enables the safety cover of the present invention to be used as a security/surveillance device. The coaxial output port may be adapted to provide conventional cable TV signals, and/or the video signal from the video eye.

The video eye may be programmable to turn on with motion sensor, or it can be on timer clock to go on and off at random intervals. This operation can either be controlled independently or by the main computer.

Although several preferred embodiments of this invention have been described in detail herein with reference to the accompanying drawings, it is to be understood that the invention is not limited to these precise embodiments, and that various changes and modifications may be affected therein by one skilled in the art without departing from the scope or spirit of the invention.

What is claimed is:

1. An apparatus comprising:
    a safety cap including prongs made of a non-electrically conductive material shaped to fit into an electrical outlet;
    an adhesive section for connecting the apparatus to an electrical outlet cover plate; and
    a bendable section for rotating the prongs from a position outside an electrical outlet to a position inside an electrical outlet.

2. The apparatus of claim 1, wherein the apparatus is "T" shaped.

3. The apparatus of claim 1, wherein the apparatus has a hole to receive the central screw of an outlet cover plate.

4. The apparatus of claim 1, wherein the adhesive section is frame-shaped such that it would surround the outlet on an electrical outlet cover plate.

5. The apparatus of claim 1 further comprising a tab attached to the safety cap for removing the safety cap.

6. The apparatus of claim 5, further comprising a ridge or bar that allows for popping-up the tab on the safety cap into a position that allows for the prongs of the safety cap to be removed from the electrical outlet.

* * * * *